US011717383B2

(12) United States Patent
Jo (10) Patent No.: US 11,717,383 B2
(45) Date of Patent: Aug. 8, 2023

(54) RETAINER AND METHOD FOR PRODUCTION THEREOF

(71) Applicant: Yong-Min Jo, Dusseldorf (DE)

(72) Inventor: Yong-Min Jo, Dusseldorf (DE)

(73) Assignee: CA-DIGITAL GmbH, Hilden (DE)

( * ) Notice: Subject to any disclaimer, the term of this patent is extended or adjusted under 35 U.S.C. 154(b) by 832 days.

(21) Appl. No.: 16/177,838

(22) Filed: Nov. 1, 2018

(65) Prior Publication Data

US 2019/0090985 A1   Mar. 28, 2019

Related U.S. Application Data

(63) Continuation of application No. PCT/EP2017/061188, filed on May 10, 2017.

(30) Foreign Application Priority Data

May 17, 2016   (DE) .................. DE102016109007.7

(51) Int. Cl.
| | | |
|---|---|---|
| *A61C 7/08* | (2006.01) | |
| *A61C 7/00* | (2006.01) | |
| *B33Y 10/00* | (2015.01) | |
| *B33Y 50/02* | (2015.01) | |
| *B33Y 80/00* | (2015.01) | |
| *B29C 64/124* | (2017.01) | |
| *B29C 64/393* | (2017.01) | |

(52) U.S. Cl.
CPC ............... *A61C 7/08* (2013.01); *A61C 7/002* (2013.01); *B29C 64/124* (2017.08); *B29C 64/393* (2017.08); *B33Y 10/00* (2014.12); *B33Y 50/02* (2014.12); *B33Y 80/00* (2014.12)

(58) Field of Classification Search
CPC .. A61C 7/00; A61C 7/08; A61C 7/002; B33Y 10/00; B33Y 50/02; B33Y 80/00; B29C 64/124
USPC ........................................ 433/6, 24
See application file for complete search history.

(56) References Cited

U.S. PATENT DOCUMENTS

| 4,253,828 | A | | 3/1981 | Coles et al. | |
|---|---|---|---|---|---|
| 4,413,978 | A | * | 11/1983 | Kurz ......................... | A61C 7/08 433/6 |
| 4,894,012 | A | * | 1/1990 | Goldberg ................ | A61C 5/007 433/167 |
| 5,536,169 | A | * | 7/1996 | Yousefian ............... | A61C 5/007 433/6 |

(Continued)

FOREIGN PATENT DOCUMENTS

| CN | 101559006 | 10/2009 |
|---|---|---|
| EP | 2967756 A1 | 1/2014 |
| WO | WO2014008583 | 1/2014 |

*Primary Examiner* — Yogesh P Patel
(74) *Attorney, Agent, or Firm* — Von Rohrscheidt Patents (57) ABSTRACT

A retainer for stabilizing a position of teeth of a human dentition, the retainer comprising: an arc that has a parabolic curvature overall so that the retainer is applicable to teeth of an upper jaw or lower jaw of a patient to be treated, wherein the retainer includes a plurality of local shapes that are arranged along a center line of the retainer and that are oriented perpendicular to the center line, wherein the local shapes are respectively adapted to cooperate with interdental spaces between adjacent teeth, wherein the retainer is integrally provided in one piece from a thermoplastic synthetic material which is configured to be processed by a SD pressure method.

8 Claims, 5 Drawing Sheets

(56) References Cited

U.S. PATENT DOCUMENTS

| | | | |
|---|---|---|---|
| 5,938,436 A * | 8/1999 | Shevel | A61F 5/566 |
| | | | 128/860 |
| D638,129 S * | 5/2011 | Inman | D24/180 |
| 2008/0044786 A1 | 2/2008 | Kalili | |
| 2008/0227049 A1* | 9/2008 | Sevinc | A61C 5/007 |
| | | | 433/6 |
| 2013/0302742 A1* | 11/2013 | Li | B32B 27/285 |
| | | | 264/16 |
| 2014/0023983 A1* | 1/2014 | Lowe | A61C 7/08 |
| | | | 433/24 |
| 2016/0058527 A1* | 3/2016 | Schumacher | A61C 7/002 |
| | | | 433/6 |
| 2016/0120620 A1 | 5/2016 | Tairaku | |

\* cited by examiner

RETAINER AND METHOD FOR PRODUCTION THEREOF

RELATED APPLICATIONS

This application is a continuation of International Application PCT/EP2017/0061188 filed on May 10, 2017, claiming priority from German Patent Application 10 2016 109 007.7, filed on May 17, 2016, both of which are incorporated in their entirety by this reference.

FIELD OF THE INVENTION

The instant invention relates to a retainer for stabilizing a position of teeth of a human dentition and to a method for producing the retainer.

An "arc" according to the instant invention is an elongated element which has the curved shape described supra. The shape is thus configured so that the arc is adapted to a shape of a lower jaw or upper jaw so that the arc is applicable to the teeth of the lower jaw or the upper jaw of the patient to be treated. In order to facilitate a force transmission between the retainer and the teeth to be treated, the arc applied to the teeth is connected with the teeth in a force transferring manner by a connecting device. Ideally the arc is configured so that it is individually adapted to the teeth that are respectively to be treated so that a distance between the arc and tooth surfaces that face the arc are minimized.

Shapes which are typically arranged in a plurality along the center line of the retainer are in particular local peaks which extend perpendicular to the center line of the retainer. The local shapes are used to support the retainer as closely as possible along tooth surfaces of the teeth to be treated. This applies in particular for the interdental spaces. The retainer extends into the interdental spaces by means of the shapes instead of bridging the interdental spaces in a straight line between contact spots of the retainer at the tooth surfaces. This ideally creates form locking after applying the retainer to the teeth to be treated wherein the form locking is viewed along a center line of the retainer so that a movement of the retainer in a direction parallel to its center line is blocked. Put differently the retainer is advantageously provided "precisely fitted" wherein this embodiment is facilitated by the described shapes.

The "center line" of the retainer is an axis about which the retainer extends with its overall curved shape. Viewing the retainer respectively in its cross section the center line is overall a sum of all centers of gravity of the retainer in all of its cross sections.

A "one piece" configuration of the retainer according to the invention is integrally configured in one piece. Thus, it is possible that the retainer is assembled from plural components or elements during fabrication. After completing the retainer the individual components form a single one piece element in which gaps or material boundaries are typically not detectable. It is furthermore conceivable that the retainer if formed by several elements which are bonded together during the production of the retainer.

With reference to the method described supra a "scanning device" according to the instant invention is a device that facilitates detecting at least individual teeth of a human dentition. A scanning device of this type can be formed in particular by an interoral scanner that is introduced into the mouth cavity of the patient to be treated and that detects the individual teeth by optical measuring devices. Thus it is also conceivable that the scanning device is formed by a molding compound, e.g. plaster.

A "digital model" of the teeth is a model that is provided in a form of data by which the teeth can be virtually represented in a data processing device.

The "virtual retainer" is a retainer that is not physical but only virtually designed in a data processing system, typically by a graphical method. By comparison a "real retainer" is a physical object that is tangible and in particular capable to operate with the teeth to be treated.

BACKGROUND OF THE INVENTION

Retainers and methods for producing the retainers are known in the art. In particular a retainer is known that is produced by a CAD/CAM method, wherein the retainer is machined from a block of material. This method is described among other places in the European patent application EP 2 967 756 A1. A retainer of this type is also commercially available under the trade name Memotain®.

The known retainer already has many substantial advantages, in particular it is adapted with great precision to a surface of the teeth to be treated so that a distance between the retainer and the respectively associated tooth surfaces is very small over the length of the retainer. This yields a particular wear comfort of the retainer.

The known retainer is formed from a shape memory material in particular from Nitinol. With respect to the particularly advantageous elastic properties and its high level of biocompatibility the material is very well suited. However, producing the retainer from a solid block of material is rather complex and expensive. In particular the material used for the retainer is very expensive and a considerable amount of waste is produced when fabricating the retainer since the prior art retainer is cut from a piece of sheet metal.

The recited method step furthermore limits possible cross section shapes of the retainer thus formed since typically only rectangular cross sections can be generated.

BRIEF SUMMARY OF THE INVENTION

Thus, it is an object of the invention to provide a retainer whose fabrication is less expensive and more flexible than known methods. Furthermore it is an object of the instant invention to provide a respective production method.

The object is achieved by a retainer for stabilizing a position of teeth of a human dentition, the retainer including an arc that has a parabolic curvature overall so that the retainer is applicable to teeth of an upper jaw or lower jaw of a patient to be treated, wherein the retainer includes a plurality of local shapes that are arranged along a center line of the retainer and that are oriented perpendicular to the center line, wherein the local shapes are respectively adapted to cooperate with interdental spaces between adjacent teeth, wherein the retainer is integrally provided in one piece, wherein the retainer is formed from a thermoplastic synthetic material that is processible by a 3-D printing method, wherein the retainer is configured so that a height of the retainer measured parallel to a vertical axis of the retainer has a dimension of at least twice a thickness of the retainer.

The object is also achieved by a method for producing the retainer, the method including the steps scanning the teeth to be treated by a scanning device and subsequently generating a digital model of the teeth from data collected by the scanning; designing a virtual retainer in the digital model, wherein the virtual retainer is adapted to the digital model of the scanned teeth so that a physical retainer that is modeled after the virtual retainer and connected with the teeth to be treated in a force-transferring manner is capable to at least essentially stabilize the teeth to be treated in a position that is provided when the teeth are scanned by the scanning device; and master forming the physical retainer by a 3D printer based on data of the virtual retainer.

In particular a synthetic material shall be used that has thermoplastic properties wherein the synthetic material is advantageously suited in particular for processing by a 3D printing method. The following synthetic materials are suitable in particular: polyether ketones, in particular polyetheretherketones (PEEK), thermoplastic Fluor synthetic materials, in particular polyvinylidenflouride (PVFD), polyoxymethylene, (POM) and polyimides, in particular polyether imide (PEI).

"3-D printing" according to the instant invention is building the three-dimensional work piece in layers. A method of this type is typically computer controlled based on digital models. As a matter of principle, it is conceivable that various materials are processed by a 3-D printing method, in particular synthetic materials, synthetic resins, ceramics and metals. The most important techniques of 3-D printing are selective laser melting, selective laser sintering and stereo lithography wherein in particular the latter two methods are also used for plastic materials or even mostly for plastic materials.

The retainer according to the invention has many advantages. On the one hand side, the base material of a synthetic material is much less expensive than the Nitinol that is used according to the prior art. On the other hand side, using a synthetic material of this type facilitates using a 3-D printing method for producing the retainer according to the invention. According to this method the retainer is typically master formed wherein an amount of material used is typically at least essentially included in the retainer itself and advantageously hardly any scrap or no scrap is produced at all. Furthermore, it is easily possible to select a synthetic material with suitable mechanical properties which are suitable for a retainer. The same applies with respect to biocompatibility of a material of this type. A retainer formed from a synthetic material is, therefore well suited for practical applications. Furthermore, a retainer according to the invention is more affordable due to the technique used and producible in fewer method steps than the prior art retainer.

The flat configuration of the retainer according to the invention furthermore has the advantage that a surface of the retainer can cooperate with a surface the teeth to be treated. Retainers that are known in the art are typically wire-shaped as stated supra, wherein they either have a square or an elliptical cross-section. Connecting retainers of this type with teeth to be treated is performed by a connection device, typically by a synthetic glue, which cooperates with areas of the tooth surfaces of the teeth.

Due to its surface area the retainer can be adapted along its height to a contour of the respectively contacting teeth and can thus form a particularly good connection with the teeth. Accordingly the stabilization effect of the retainer is increased over retainers that are known in the art. A retainer of this type can also be configured rather thin so that it has very little detrimental interference in an oral cavity of the patient and thus increases wearing comfort of the retainer. Furthermore, a retainer of this type can be worn in a very hygienic manner since it is hardly prone or not at all prone to catch food leftovers.

The configuration of the retainer is particularly advantageous for forming its flat surface area, since the synthetic material can be formed individually, in particular by a 3-D printing method as will be described infra. Advantageously the height of the retainer is at least five times the amount of its thickness.

Advantageously a flat retainer is configured inclined relative to its vertical axis. This means that a distance of an upper edge of the retainer from a vertical axis is greater than a distance of a lower edge of the retainer. This shape can be derived from the subsequent embodiments. It is particularly well suited to cooperate with teeth since the tooth surfaces typically extend from a lower edge that is directly adjacent to the gingival to an upper edge that is oriented away from the gingival in a "forward" direction, this means in a labial direction. The conical expansion or inclined arrangement of the retainer in a 3-dimensional space is adapted to this shape of the tooth surfaces and facilitates applying the retainer to the tooth surfaces.

In a particularly advantageous embodiment of the retainer according to the invention, the synthetic material used is from the materials group polyaryletherketones. Advantageously the synthetic material is a polyetheretherketone (PEEK). This synthetic material is particularly advantageous in that it has ideal mechanical properties as well as a particularly high level of biocompatibility and is thus particularly suited for an application as a retainer. Being a super-elastic material PEEK differs from other synthetic materials in that it has hardly any tendency to fracture. This facilitates a very detailed configuration of the retainer with tapered portions as will be described infra. Furthermore, manufacturing methods are known which facilitate producing a synthetic material by a 3-D printing method. Consequently it is conceivable that a retainer formed by PEEK is printed directly based on a CAD-model by a respective printing device. The instant application relates to a method of this type as will be described infra in more detail. Using a particular 3-D printing method is, however, is not mandatory. In particular it is conceivable to produce a retainer formed from PEEK, for example, by a laser sintering method or by a stereolithography method. Alternative 3-D printing methods are also conceivable wherein additional methods may be forthcoming over time that are equally suitable.

In another advantageous embodiment of the retainer according to the invention at least one local shape of the retainer advantageously plural shapes of the retainer have a curvature radius of less than 1.0 mm, advantageously less than 0.5 mm, further advantageously less than 0.2 mm. Shapes of this type are so to speak "pointed" so that they can engage pointed inter dental spaces between adjacent teeth of the patient to be treated particularly well. A retainer thus configured can be adapted particularly well to the teeth so that it extends only very little starting from the teeth into an oral cavity of the patient to be treated and offers particularly good wearing comfort for the patient. Furthermore a well-adapted retainer of this type is not prone to contamination by comparison since only few to no gaps are between the retainer and the teeth in which gaps food leftovers can accumulate. Thus, a retainer that contacts the teeth rather precisely is also advantageous for hygiene.

Furthermore a retainer is particular advantageous that has a three dimensional shape. The term "three dimensional shape" in this context means that a center line of the retainer which is monodimensional by itself in the mathematical sense is not arranged in its entirety in a two dimensional plane. This means that there are at least two planes which respectively include two points along the center line of the retainer, wherein both planes are not linear independent from each other. Figuratively speaking a three dimensional retainer of this type does not only extend along an arc but also out of a plane of the arc.

A three dimensional retainer of this type is particular well suited to be adapted to individual properties of a respective patient. It is possible in particular to run the retainer exclusively along its length and exclusively over the teeth if possible wherein the retainer is advantageously shaped so that it yields to the interdental gingival papillae. Thus, the arc of the retainer is run upward at lateral edges of the respective tooth and thus out of the arc plane. The three dimensional shape according to the invention facilitates over the two dimensional shape according to the invention that the retainer extends in a vertical direction of the teeth and can thus yield to the gingival papillae.

It is appreciated that a retainer is conceivable which is configured flat as well as three dimensional according to the instant invention. This means that a flat retainer is also conceivable whose center line extends at least partially outside of a plane.

Furthermore a retainer is particularly advantageous which includes at least one flat transmission arrangement, advantageously a plurality of flat transmission arrangements. A transmission arrangement of this type is suitable to be connected with a tooth surface of a tooth in a connection surface area. Thus, transmission arrangements of this type provide force transmission between the retainer and the teeth to be treated. In a particular advantageous embodiment the at least one transmission arrangement is integrally configured with the remaining retainer in one piece. In particular it is conceivable that the transmission surface is imprinted as part of the retainer by a three dimensional printing method together with the remaining retainer. An embodiment of this type is particularly advantageous for a rod shaped configuration of the arc of the associated retainer.

If the retainer is configured as a lingual retainer that is configured to cooperate with a lingual surface of the teeth to be treated, it can be furthermore particularly advantageous when the retainer includes at least one veneer connected to the retainer wherein the veneer is configured to cooperate with a labial surface of at least one tooth that is oriented towards a lip. A veneer of this type has the purpose to cover a respective labial surface of the respective tooth optically so that the natural tooth surface is invisible to a viewer of the teeth. A retainer thus configured therefore not only has therapeutic utility in that it stabilizes the teeth in their respective current position, but it can additionally fulfil a cosmetic purpose in that the teeth are optically covered by the at least one veneer. Advantageously the retainer includes a plurality of veneers, wherein typically one respective veneer cooperates with a labial surface of a respective tooth.

In another advantageous embodiment of the retainer according to the invention the retainer is configured as a tooth rail which is configured to be placed over teeth that are to be treated. This placement is performed so that the retainer cooperates with lingual surfaces as well as with labial surfaces of the teeth to be treated. In particular the tooth rail is configured as a negative of the teeth to be treated so that the tooth rail applies to the teeth precisely fitted and can thus have a veneer effect at their labia surfaces and a stabilizing effect that their lingual surfaces.

Improving upon the method describe supra the object is achieved by the following method step:

c) master forming the physical retainer by a 3D printer based on data of the virtually designed retainer.

Independently from its configuration in detail the retainer described supra is producible in a particularly simple manner by the method according to the invention. The method is thus particularly advantageously in that the retainer to be produced is directly master formed from a material, wherein the material use for this process corresponds at least essentially, advantageously entirely, to the amount of material from which the subsequent finished container is made. There is very little material scrap or advantageously no material scrap at all.

The method according to the invention is also particularly advantageous for a precise configuration of a retainer since the data of the virtually generated retainer is directly implemented by a 3 D printer to that there is no intermediary step which could generate an additional difference between the virtual model and the subsequent physical retainer. Put differently the retainer is producible particularly precisely by the method according to the invention so that it can be applied to the teeth to be treated precisely fitted. The method according to the invention thus implemented is a CAD/CAM method.

In a particularly advantageously embodiment of the method according to the invention the retainer has its final shape immediately after the completion of the 3-D printing. This means that the retained does not require any additional finishing, e.g., by a mechanical tool or similar in order to be used for a patient. Thus, the complexity for producing the retainer is reduced, and on the other hand side, precision of fabrication is improved since the quality of the finished product does not depend on individual abilities of a person working on the retainer. This has a positive effect upon uniformity and constant quality of the retainer to be fabricated.

In order to fabricate the retainer by 3-D printing it is particularly advantageous to print the retainer in layers. Thus, a material nozzle of the 3-D printer advantageously continuously tracks a contour of the retainer parallel to the center line of the retainer in a cyclical manner. Put differently the material nozzle moves from one end of the arc of the retainer to the opposite end of the retainer and applies a material layer during the movement. After completing the layer, the material nozzle is moved "upward", this means in a direction that is parallel to a vertical axis of the container. Thus, the material nozzle is raised by an amount of the thickness of the previously applied layer. Thereafter, the material nozzle moves along the contour of the retainer back to the opposite end of the arc, wherein the applied layer is applied to the preceding layer. The individual layers of the retainer are sequentially applied by a cyclical movement step by step along the contour of the retainer until the retainer is finished and has its complete height. The individual layers can have a thickness, for example, of 0.1 mm respectively.

During the printing method the thermoplastic synthetic material is heated so that it is flow capable, wherein the synthetic material cools after exiting from the material nozzle and eventually solidifies again. The layer printing method described supra thus should be performed so that a respective subsequent layer is applied to a respective preceding layer wherein the preceding layer has not solidified yet so that a bond is developed between the adjacent layers during the course of the 3-D printing method. This way the retainer is formed by a single massive component after completion. A particular advantage of the described layer printing method is that the finished retainer does not have any support structures which have to be removed from the retainer by a complex procedure to make it ready for use. Support structures of this type are quite common for current printing methods in order to able to fabricate portions of the respective printed element which protrude beyond a plan form of a first layer that is applied by the printer. The support structures are used for supporting "undercuts" in a vertical direction. This is not necessary for the method according to the invention since the respective preceding layer supports the respective subsequent layers so that undercuts are also vertically supported without support structures. A retainer that is fabricated by the method according to the invention is therefore immediately usable without any finishing.

In particular during a production of a 3-D retainer, the described printing method can be particularly advantageous when at least two material portions are created in an initial printing stage which are initially non-connected, wherein the material portions are only bonded together during subsequent printing by at least one material layer that is at a higher level relative to the at least two material portions. A retainer can be fabricated by this method which has at least two "low portions" which are configured, e.g., for application to various teeth. Towards the interdental spaces, however, the finished retainer is pulled up again in order not to contact the gingival. A situation of this type is shown in an exemplary manner in the subsequent embodiments.

It is appreciated that a 3-D retainer of this type has independent material portions in a lower sectional view. These material portions are, therefore, non-connected during fabrication at least in an initial state. Only during production of the "higher layers" of the retainer, the non-connected portions are eventually connected with each other by a continuous material layer.

This way the retainer according to the invention can be printed directly without requiring any finishing of the printed retainer. In particular, no auxiliary and/or support structures have to be removed and no surface of the retainer has to be finished. Instead, the printed retainer already has its final shape.

BRIEF DESCRIPTION OF THE DRAWINGS

The retainer according to the invention and the method according to the invention are subsequently described in more detail based on embodiments with reference to drawing figures, wherein.

DETAILED DESCRIPTION OF THE INVENTION

The embodiments include several retainers 1 that are illustrated in FIGS. 1 through 4.

Figure 1:
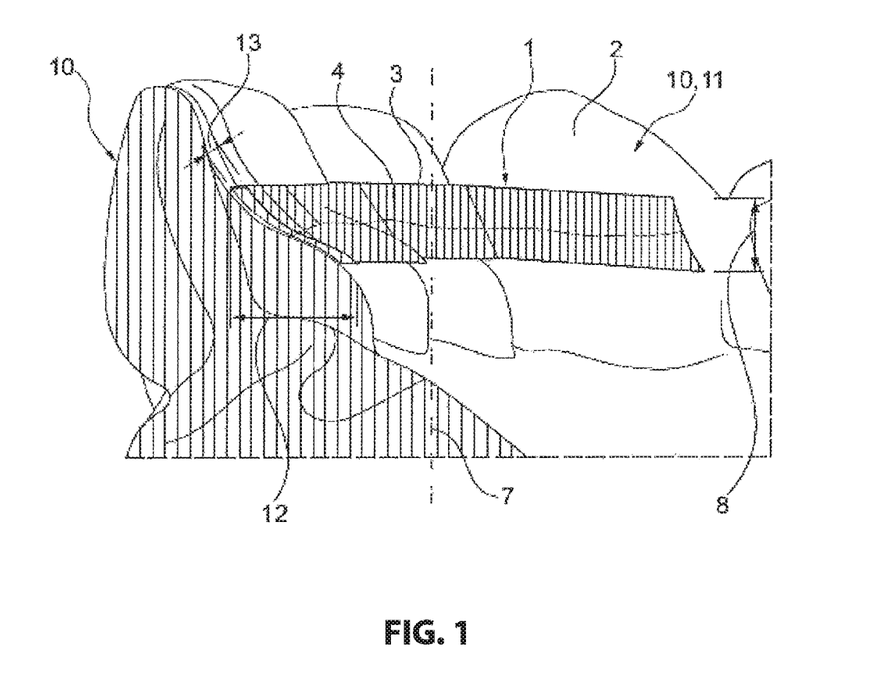
FIG. 1 illustrates a digital model of detected teeth of an upper jaw in a cross-sectional view with a virtual retainer.
Figure 2:
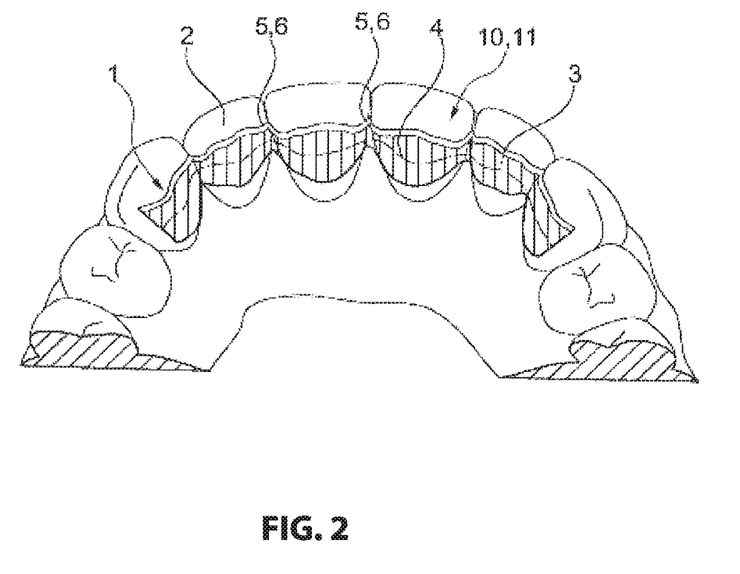
FIG. 2 illustrates the digital model according to FIG. 1 in an overall view.

The retainer 1 according to FIGS. 1 and 2 includes an arc 3 which has an overall parabolic curved shape. Thus, the arc 3 is configured so that it can engage teeth 2 of an upper jaw, wherein the arc 3 viewed along a center line 4 of the retainer 1 extends at a particularly small distance from tooth surfaces 10 of the teeth 2. The retainer 1 is configured flat and has a height 8 that extends parallel to a vertical axis 7, which is approximately five times greater than a thickness 13 of the retainer 1. Furthermore, the retainer 1 has local shapes 5 by which the arc 3 of the retainer 1 extends into interdental spaces 6 between adjacent teeth 2. The shapes 5 are pointed in a longitudinal sectional view of the arc 3, wherein a curvature radius of the shapes is approximately 0.5 mm.

As evident in particular from FIGS. 1 and 2, the retainer 1 according to the invention contacts lingual surfaces 11 of the teeth 2 to be treated. This is achieved in that a shape of the retainer 1 is adapted to the contour of the respective lingual surface 11. Differently from conventional retainers, the retainer 1 according to the invention does not have an oval, circular or rectangular cross-section, but an individual cross-section whose flat front side 14 that is oriented towards the lingual surface 11 and its opposite flat backside 15 respectively have curved polygonal shape. Such individual configuration of the retainer 1 can be achieved in a particularly simple manner by digitally capturing the teeth 2 to be treated and subsequently producing the retainer 1 by a master forming process. The method according to the invention is particularly suitable as state supra. The flat configuration of the retainer 1 has the particular advantage that a rather large force transmission surface can be provided between the teeth 2 and the retainer 1, but the retainer 1 in itself can be configured rather thin. Put differently, the thickness 13 of the retainer 1 according to the invention is particularly small which makes the retainer 1 wear more comfortably and reliably in a mouth of a patient.

In order to create a force-transmitting connection between the retainer 1 and the associated tooth surfaces 10, a surface of the retainer 1 that is oriented towards the teeth 2 is provided with an adhesion agent which is applied to the surface of the retainer 1 before applying the retainer 1 to the teeth 2 of the patient to be treated.

The illustrated retainer 1 has been fabricated by a 3-D printing method and is made from a polyetheretherketone (PEEK). As evident in particular from FIG. 1 the retainer 1 extends along its height 8 in a direction that is perpendicular to its center line 4 and to its vertical axis 7. Put differently, an overall radius of the retainer 1 is greater in an upper edge portion than in a lower edge portion. This shape is due to a natural shape of the tooth surface 10 of the teeth 2 according to which the retainer 1 is shaped. Thus, it is appreciated that the retainer 1 has a pronounced undercut along which the retainer 1 extends over its depth 12.

The illustrated retainer 1 has been produced by a 3-D printing method during which the thermoplastic synthetic material of the retainer 1 was applied in layers. Thus, a material nozzle that is not illustrated in the drawing figures of a non-illustrated 3-D printer has moved cyclically along a contour of the retainer 1 wherein the material nozzle was moved after application of a respective layer by a particular amount parallel to the vertical axis 7 and if required in a direction of the depth 12 of the retainer 1 and has then applied the next material layer. Thus, a respective layer of the synthetic material is applied to a preceding layer. This method prints the retainer 1 step by step over its entire height 8 until it eventually has its shape that is illustrated in the drawing figures. According to this method is was not required to provide the retainer 1 with support structures during its production in order to support the undercut of the retainer 1. Instead the retainer 1 is supported by the layered production through its own structure also in a portion of undercuts so that no finishing is required after completion of the retainer and the retainer can be used directly at a respective patient.

As evident in particular from FIG. 2 the retainer 1 according to the invention extends in all three dimensions as evident in particular in a portion of the interdental spaces 6.

Thus, the retainer 1 is so to speak raised relative to the teeth 2 so that it evades the gingival papillae respectively between two adjacent teeth. This three dimensional configuration of the retainer 1 has the effect that the retainer 1 is made from a plurality of non-connected individual portions in a lowest longitudinal sectional view so to speak in the first layer with reference to the 3-D printing method. Only by developing the retainer 1 with the 3-D printing method in its elevation direction the individual portions are connected with each other so that the illustrated retainer 1 is eventually produced in its entirety. Thus, a respective preceding layer has not solidified yet when a respective layer of the retainer 1 is supplied so that the layers form a bond amongst each other before the synthetic material solidifies. This has the effect that the retainer 1 that was initially formed by individual layers is eventually integrally formed in one piece due to the bond forming between the individual layers.

Figure 3:
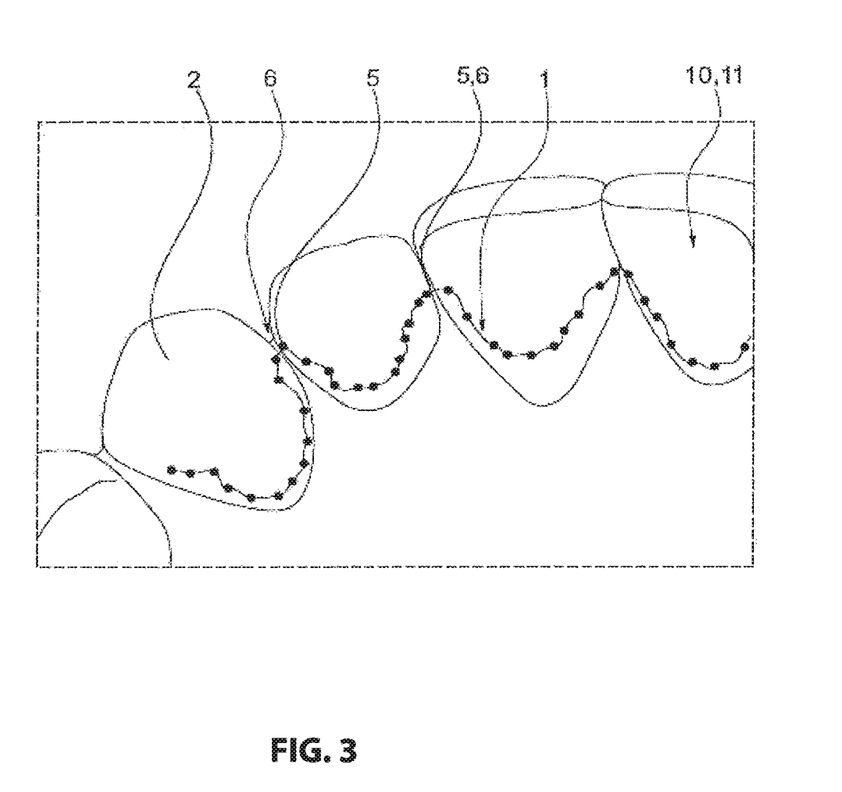
FIG. 3 illustrates a digital model of teeth of an upper jaw with a virtual three-dimensional retainer in a design phase.
Figure 4:
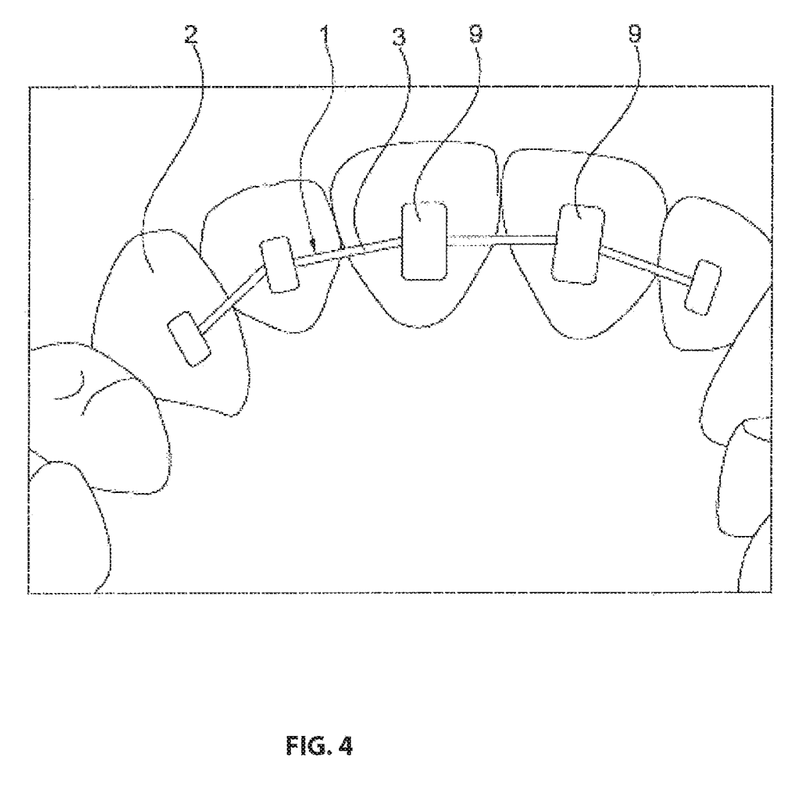
FIG. 4 illustrates a digital model of teeth of an upper jaw with a simplified representation of a virtual, rod-shaped retainer including associated transmission devices.

FIG. 3 illustrates the retainer 1 in a virtual planning phase wherein it is evident quite well how a geometry of the retainer 1 is planned three dimensionally along the teeth 2 that are to be treated. It is evident in particular that shapes 5 of the retainer 1 are pulled up in a portion of the interdental spaces 6 along a lateral flank of the respective teeth 2 so that the gingival papillae are not impaired by the retainer 1.

As already described supra it is conceivable to form the retainer 1 together with transmission devices 9 which are advantageously connected with the arc 3 of the retainer 1 integrally in one piece. In particular transmission arrangements 9 of this type can be printed directly and concurrently with producing the retainer 1. An idealized representation of the respective retainer 1 can be derived from FIG. 4. The transmission devices 9 are respectively well suited to be connected, in particular glued together with the respective contacting teeth 2 or their teeth surfaces 10 in a force transmitting manner. Transmission devices 9 of this type are suitable in particular when the retainer 1 is overall configured rod shaped or wire shaped and thus requires an additional adhesion surface for connecting with the teeth 2 to be treated.

The retainer 1 according to the invention can be printed in particular in layers, wherein a material nozzle moves cyclically along the retainer 1 and applies an additional material layer 17 during each cycle until the retainer 1 is eventually completed. Thus, it is appreciated that the material nozzle moves up by a dimension of a layer for each cycle in order to produce the next higher material layer 17.

Figure 5:
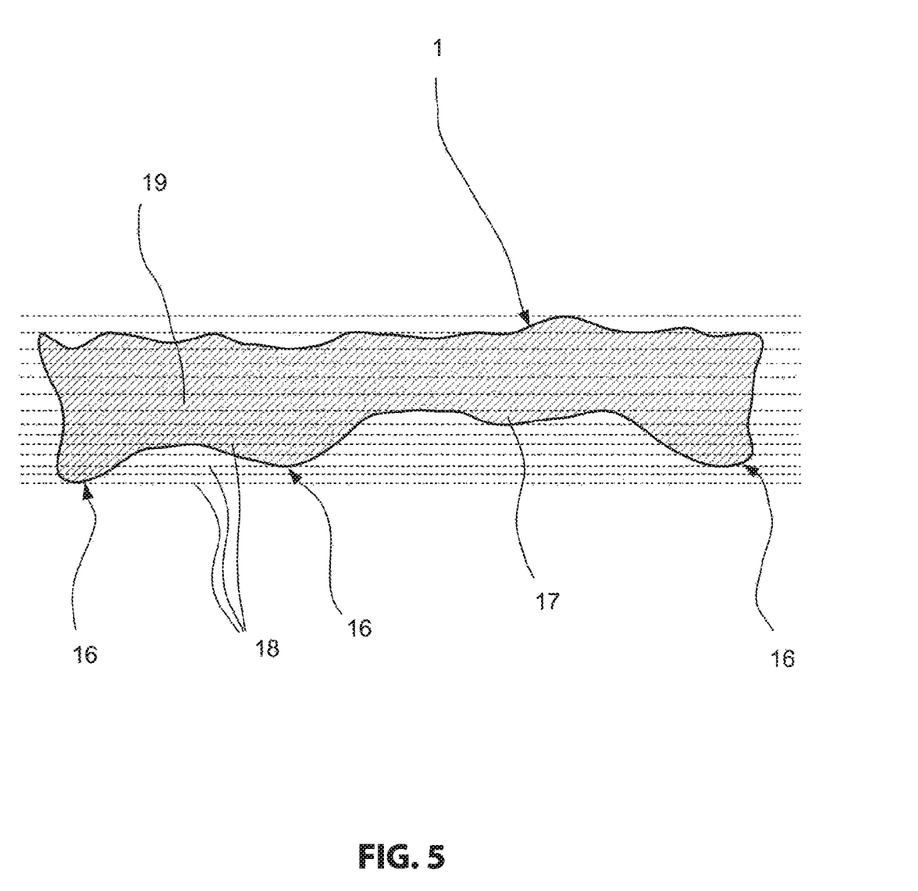
FIG. 5 illustrates a schematic representation of a three-dimensional retainer that is printed in layers.

While producing a 3-dimensional retainer 1 as illustrated in an exemplary manner in FIGS. 2 and 5, the layered production of the 3-dimensional retainer 1 has the consequence that material portions 16 are provided in initial phase of the printing process that are insulated from each other and initially unconnected. This is apparent in particular from the representation according to FIG. 5 wherein the indicated material boundaries 18 illustrate in which layers the retainer 1 is formed. Depending on a contour of the retainer 1 to be produced the layer thickness of the material layers 17 can vary.

Only when reaching a particular height level of the non-illustrated material nozzle a continuous material layer 19 is produced during a material application cycle, wherein the continuous material layer eventually bonds material portions 16 together that were previously isolated from each other. In the finished condition the retainer is integrally provided in one piece and has its final shape.

It is appreciated that the features previously described in conjunction with the embodiments do not necessarily have to be sued in the described feature combinations and can be advantageously implemented independently from each other.

REFERENCE NUMERALS AND DESIGNATIONS

1 retainer
 2 tooth
 3 arc
 4 center line
 5 shape
 6 interdental space
 7 vertical axis
 8 height
 9 transmission arrangement
 10 tooth surface
 11 lingual surface
 12 depth
 18 thickness
 14 front side
 15 back side
 16 material portion
 17 material layer
 18 layer boundary
 19 material layer

What is claimed is:

1. A flexible retainer for stabilizing a position of teeth of a human dentition, the retainer comprising:
   an arc that has a curvature so that the retainer is applicable to teeth of an upper jaw or lower jaw of a patient to be treated,
   wherein the retainer includes a plurality of local shapes that are arranged along a center line of the retainer and that are oriented perpendicular to the center line,
   wherein the local shapes are respectively adapted to cooperate with interdental spaces between adjacent teeth,
   wherein the retainer is formed from a thermoplastic synthetic material that is processible by a 3-D printing method,
   wherein the retainer is one continuous piece of the thermoplastic synthetic material, and
   wherein the retainer is configured so that a height of the retainer measured parallel to a vertical axis of the retainer has a dimension of at least twice a thickness of the,
   wherein the retainer does not include teeth conforming cavities.

2. The retainer according to claim 1, wherein the height of the retainer has at least three times or at least five times the dimension of its thickness.

3. The retainer according to claim 1, wherein the thermoplastic synthetic material from which the retainer is formed is a polyaryletherketone, or polyetheretherketone.

4. The retainer according to claim 1, wherein at least one local shapes of the retainer has a curvature radius of less than 1.0 mm or less than 0.5 mm or less than than 0.2 mm.

5. The retainer according to claim 1, wherein the retainer has a three dimensional shape so that the center line of the retainer does not extend entirely in one plane.

6. The retainer according to claim 1, wherein the retainer includes a continuous layer of the thermoplastic synthetic material which connects to at least two portions of another layer of the thermoplastic synthetic material where the at least two portions of the another layer of the thermoplastic synthetic material are not connected to each other without the continuous layer of the thermoplastic synthetic material.

7. The retainer according to claim 6, wherein the at least two portions of the thermoplastic synthetic material are configured to be glued to a lingual surface of a tooth.

8. The retainer according to claim 1, wherein the retainer cooperates with a lingual surface of the teeth to be treated but not a labial surface of the teeth to be treated.

\* \* \* \* \*